United States Patent
Pennline et al.

(10) Patent No.: US 6,521,021 B1
(45) Date of Patent: Feb. 18, 2003

(54) THIEF PROCESS FOR THE REMOVAL OF MERCURY FROM FLUE GAS

(75) Inventors: Henry W. Pennline, Bethel Park, PA (US); Evan J. Granite, Wexford, PA (US); Mark C. Freeman, South Park Township, PA (US); Richard A. Hargis, Canonsburg, PA (US); William J. O'Dowd, Charleroi, PA (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 0 days.

(21) Appl. No.: 10/040,758

(22) Filed: Jan. 9, 2002

(51) Int. Cl.[7] .......................... B01D 53/06; B01D 53/64
(52) U.S. Cl. ............................ 95/134; 95/901; 96/153; 423/210; 110/203; 110/345
(58) Field of Search ..................... 95/107, 134, 900, 95/901; 96/150, 153; 423/210; 502/416, 417; 110/203, 216, 345

(56) References Cited

U.S. PATENT DOCUMENTS

| | | | | |
|---|---|---|---|---|
| 5,405,812 A | * | 4/1995 | Bruggendick | 422/177 |
| 5,507,238 A | * | 4/1996 | Knowles | 110/216 |
| 5,569,436 A | * | 10/1996 | Lerner | 110/235 |
| 5,787,823 A | * | 8/1998 | Knowles | 110/235 |
| 5,854,173 A | * | 12/1998 | Chang et al. | 502/182 |
| 5,891,324 A | * | 4/1999 | Ohtsuka | 208/251 R |
| 6,027,551 A | * | 2/2000 | Hwang et al. | 95/134 |
| 6,136,072 A | * | 10/2000 | Sjostrom et al. | 55/302 |
| 6,322,613 B1 | * | 11/2001 | Wojtowicz et al. | 95/107 |
| 6,372,187 B1 | * | 4/2002 | Madden et al. | 110/345 |
| 6,439,138 B1 | * | 8/2002 | Teller et al. | 110/203 |
| 6,451,094 B1 | * | 9/2002 | Chang et al. | 110/342 |

FOREIGN PATENT DOCUMENTS

WO      WO 99/08777     * 2/1999

* cited by examiner

Primary Examiner—David A. Simmons
Assistant Examiner—Frank M. Lawrence
(74) Attorney, Agent, or Firm—Brian J. Lally; Bradley W. Smith; Paul A. Gottlieb

(57) ABSTRACT

A system and method for removing mercury from the flue gas of a coal-fired power plant is described. Mercury removal is by adsorption onto a thermally activated sorbent produced in-situ at the power plant. To obtain the thermally activated sorbent, a lance (thief) is inserted into a location within the combustion zone of the combustion chamber and extracts a mixture of semi-combusted coal and gas. The semi-combusted coal has adsorptive properties suitable for the removal of elemental and oxidized mercury. The mixture of semi-combusted coal and gas is separated into a stream of gas and semi-combusted coal that has been converted to a stream of thermally activated sorbent. The separated stream of gas is recycled to the combustion chamber. The thermally activated sorbent is injected into the duct work of the power plant at a location downstream from the exit port of the combustion chamber. Mercury within the flue gas contacts and adsorbs onto the thermally activated sorbent. The sorbent-mercury combination is removed from the plant by a particulate collection system.

19 Claims, 3 Drawing Sheets

THIEF PROCESS FOR THE REMOVAL OF MERCURY FROM FLUE GAS

U.S. GOVERNMENT RIGHTS

The United States Government has rights in this invention pursuant the employer-employee relationship of the Government to the inventors as U.S. Department of Energy employees at the National Energy Technology Laboratory.

BACKGROUND OF THE INVENTION

More than 32% of the mercury emitted in the United States to the atmosphere is from coal-burning utilities. Should further mercury control emissions from municipal solid waste and medical waste incinerators be mandated, the percentage of mercury released to the atmosphere from coal-burning utilities would greatly increase. A low concentration of mercury, on the order of 1 part per billion by volume (ppbv), is found in flue gas when coal is burned. The primary forms of mercury in the flue gas are elemental mercury and oxidized mercury (believed to be mercuric chloride).

Existing control technologies for the removal of mercury from flue gas include scrubbing solutions and activated carbon sorbents. An estimated 25% of power plants have wet scrubbers. Because mercuric chloride is soluble in water and elemental mercury is not, some mercuric chloride will be removed by the scrubbing process, whereas elemental mercury will not be removed by this process. Dry sorbents have the potential to remove both elemental and oxidized forms of mercury. Activated carbon is a dry sorbent that is suitable for removing contaminants, including mercury, from various gas streams. Activated carbon is typically obtained by heating carbonaceous material in the absence of air and then controlling an oxidation step with steam or carbon dioxide. This process results in a porous internal structure of the carbon that has good adsorptive properties. Activated carbons have been successfully applied for the control of mercury emissions from incinerators.

Carbon sorbents operate effectively over a limited temperature range, typically working best at temperatures below 300° F. However, the major drawback of using activated carbon is that the projected annual cost for an activated carbon cleanup process is extremely high, not only because of the high cost of the sorbent, but also because of its poor utilization/selectivity for mercury. Most components of flue gas will adsorb on carbon and some are in competition with mercury for adsorption on carbon. Carbon-to-mercury weight ratios projected to remove mercury are in the range of 3,000:1 to 100,000:1. The cost of a ton of carbon can currently range from $1,000 to $3,000. Additionally, the commercially available sorbent must be manufactured off-site in a separate facility, shipped, and then stored at the power generation facility.

The system and method described here are for an inexpensive alternative to commercially available activated carbon. A thermally activated sorbent is obtained by retrieving partially combusted coal (raw coal is cheap at roughly $30/ton) from the combustion zone of the power plant's combustion chamber. Once introduced to the flue gas, the sorbent reacts with mercury and removes it from the flue gas stream. The spent sorbent can be removed from the flue gas by the plant's particulate collection device or by the installation of a particulate collection device just for the sorbent. The thermal activation is similar to the activation process of commercially available activated carbon. The carbon-to-mercury weight ratios required of the thermally activated sorbent produced in-situ are on the order of the ratio required to obtain mercury removal with activated carbon. The thermally activated sorbent produced in a manner described here is much less expensive than commercially available activated carbon and therefore is more easily and economically obtained and used on-site when its demand is increased. While activated carbon is a well known sorbent, the extraction of partially combusted coal for use as a sorbent elsewhere on site represents a significant improvement in the art of removing contaminants from flue gas.

Fly ash is the incombustible residue that remains unburned and is carried out of the combustion chamber. The fly ash has been used as a sorbent to remove extremely small particulate matter, fumes, or vapor phase contaminants from flue gas. U.S. Pat. Nos. 5,507,238 ("'238") and 5,787,823 ("'823") issued to Knowles describe the use of fly ash to remove contaminant species that can be sublimated, condensed or chemisorbed onto or into the fly ash particles. These patents describe the fly ash as having been modified by capture in a particulate separation device. The capture of the fly ash in a particulate separation device is said to modify the fly ash by coarsing its particle size distribution.

The '238 and '823 patents describe the use of fly ash that is taken from the exit port of the combustion chamber for use elsewhere in the system. The in-situ method for producing a carbon sorbent described here couples on-site sorbent production with the injection of the sorbent into the duct work of a utility. Carbon structures formed and present in the combustion zone of pulverized coal plants are much more reactive for the removal of mercury from downstream flue gas than residual carbon found on fly ash which had a longer residence time within the combustion chamber and where oxidation of carbon is more nearly complete.

Fly ash may sometimes contain unburned carbon that may be separated from the fly ash and activated for the removal of contaminants from flue gas. However, such processes cannot alter the characteristics of the carbon extracted from fly ash without significant physical and/or chemical treatments. Thus, the thermally activated solids of the system and method described here will outperform fly ash of equivalent carbon content. The better performance is due to the inherent nature of the complex carbon structures present in the thermally activated solids, such as residual sulfur content, etc. that create a greater reactivity toward the removal of mercury from flue gas. Therefore, the system and process described here represent significant improvements in the art of flue gas treatment for the removal of mercury.

OBJECTS OF THE INVENTION

An object of this invention is to provide a system and method of producing a thermally activated carbon sorbent by extracting a stream of partially combusted carbon from the combustion chamber of a coal-fired power plant.

A further object of this invention is to use the thermally activated sorbent at the power plant where it was produced to remove mercury from flue gas by injecting the sorbent into the duct work of the facility downstream from the exit port of the combustion chamber. The spent sorbent can be collected in the plant's particulate collection system or in a particulate collection system dedicated just for the sorbent.

SUMMARY OF THE INVENTION

The system and method described here represent an inexpensive alternative to commercially available activated carbon for removing mercury from the flue gas of a coal fired power plant. Mercury removal is by adsorption onto a thermally activated sorbent produced in-situ at the power plant. To obtain the thermally activated sorbent, at least one lance, called a "thief", is inserted into a location within the combustion zone of the combustion chamber and extracts a mixture of semi-combusted coal and gas. The semi-combusted coal has adsorptive properties suitable for the removal of elemental and oxidized mercury. The mixture of semi-combusted coal and gas is separated into a stream of gas and semi-combusted coal that has been converted to a stream of thermally activated sorbent. The separated stream of gas can be recycled to the combustion chamber. The thermally activated sorbent is injected into the duct work of the power plant at a location downstream from the exit port of the combustion chamber. Mercury within the flue gas contacts and adsorbs onto the thermally activated sorbent. The used sorbent-mercury combination is removed from the flue gas by a particulate collection system.

BRIEF DESCRIPTION OF THE DRAWINGS

FIG. 2A is a cross-section of the thief of FIG. 2.

DETAILED DESCRIPTION OF THE PREFERRED EMBODIMENT

Figure 1:
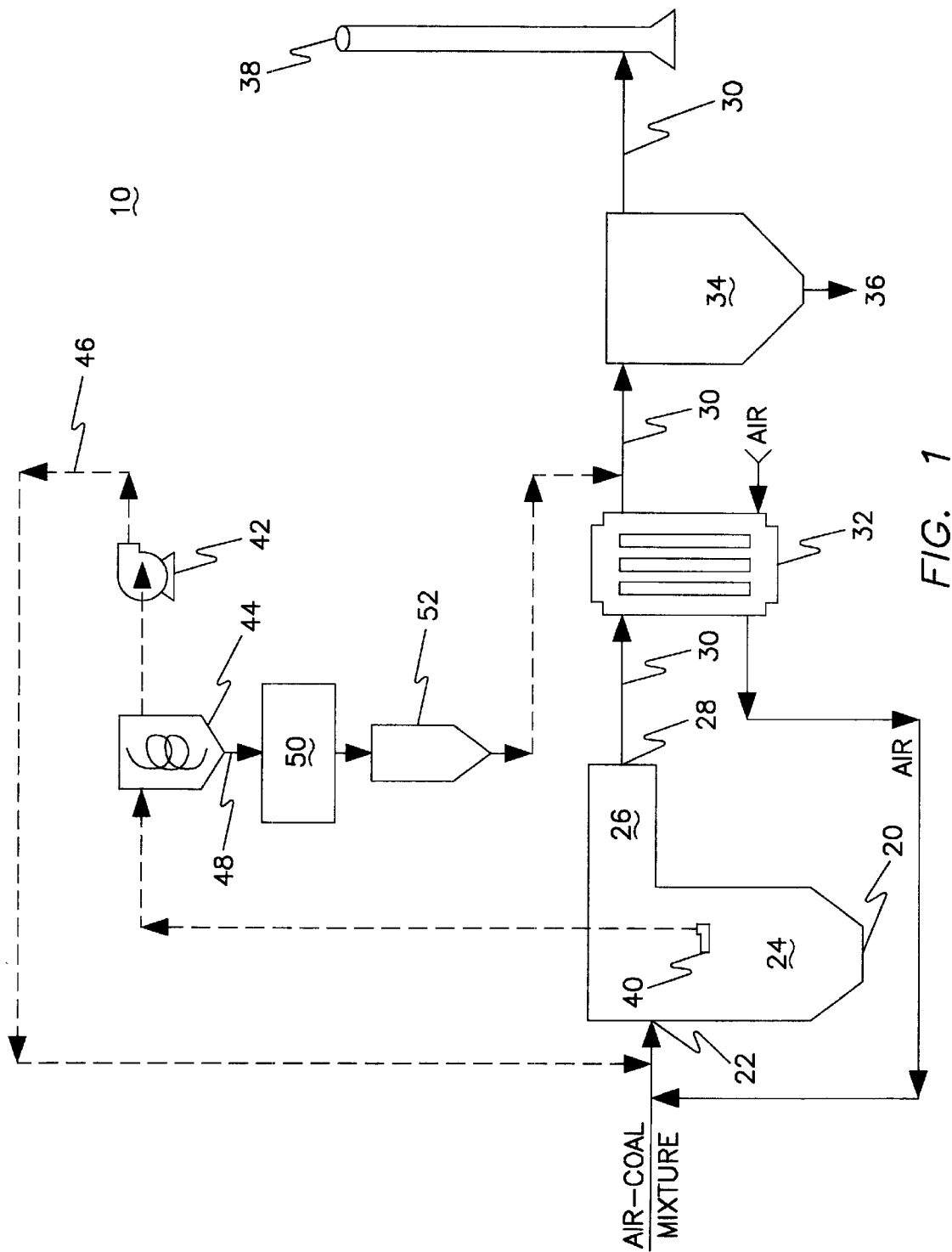
FIG. 1 is a schematic of the mercury removal system.

Referring to FIG. 1, an air-coal mixture is injected into a combustion chamber 20 of a power plant 10 via entry ports 22. The combustion chamber 20 is partitioned into a combustion zone 24 and a convective section 26. The coal of the air-coal mixture is combusted within the combustion zone 24 where the mercury, that naturally occurs in coal, is released into the gas of the combustion chamber 20. The temperature within the combustion zone can range from about 1000 to 3000° F. The gas containing the released mercury exits the combustion chamber 20 through an exit port 28 and into the duct work 30 of the power plant 10. The gas released into the duct work 30 is referred to as flue gas.

The flue gas passes through a thermal exchange unit 32 that is used to preheat air prior to its injection with coal into the combustion chamber 20. The thermal exchange unit 32 also cools the flue gas prior to its contact with the particulate collection device 34 which may be a baghouse or electrostatic precipatator. The flue gas then passes through a particulate collection system 34 where fly ash is removed from the flue gas prior to the flue gas exiting the power plant 10 through the stack 38.

The in-situ mercury removal system operates by extracting a stream of partially combusted and/or pyrolized coal and gases from the combustion zone 24 of the combustion chamber 20. The high temperatures of the combustion chamber 20 activates the coal and imparts an alteration within the coal. Mercury's affinity to adsorb onto the coal is increased by this alteration so that the coal can be described as a thermally activated sorbent. The size of the extracted coal particles can be similar to the size of coal that was injected into the combustion chamber 20. A hollow lance, a thief, 40 is inserted into the combustion zone 24 and suction is applied through the lance 40 by a gas pump 42 (or vacuum system, eductor, etc.) and draws the partially combusted coal and gas mixture out of the combustion chamber 20 and through a gas-solid separator 44 such as a cyclone separator. The thief or hollow lance 40 could be comprised of a variety of construction materials, including stainless steels. In particular, a water-cooled lance of Type 316 SS has performed well as a thief 40. Other types of stainless steel are expected to perform similarly (e.g., Type 304 or inconel). The thief 40 may use a cooling device when located in the combustion chamber 20 in order to reduce further oxidation of the solids. For example, the thief 40 could consist of a water, air, or steam-cooled chamber that is jacketed by a layer of high-temperature, highly reflective material to reduce heat transfer while the particles are withdrawn.

Figure 2:
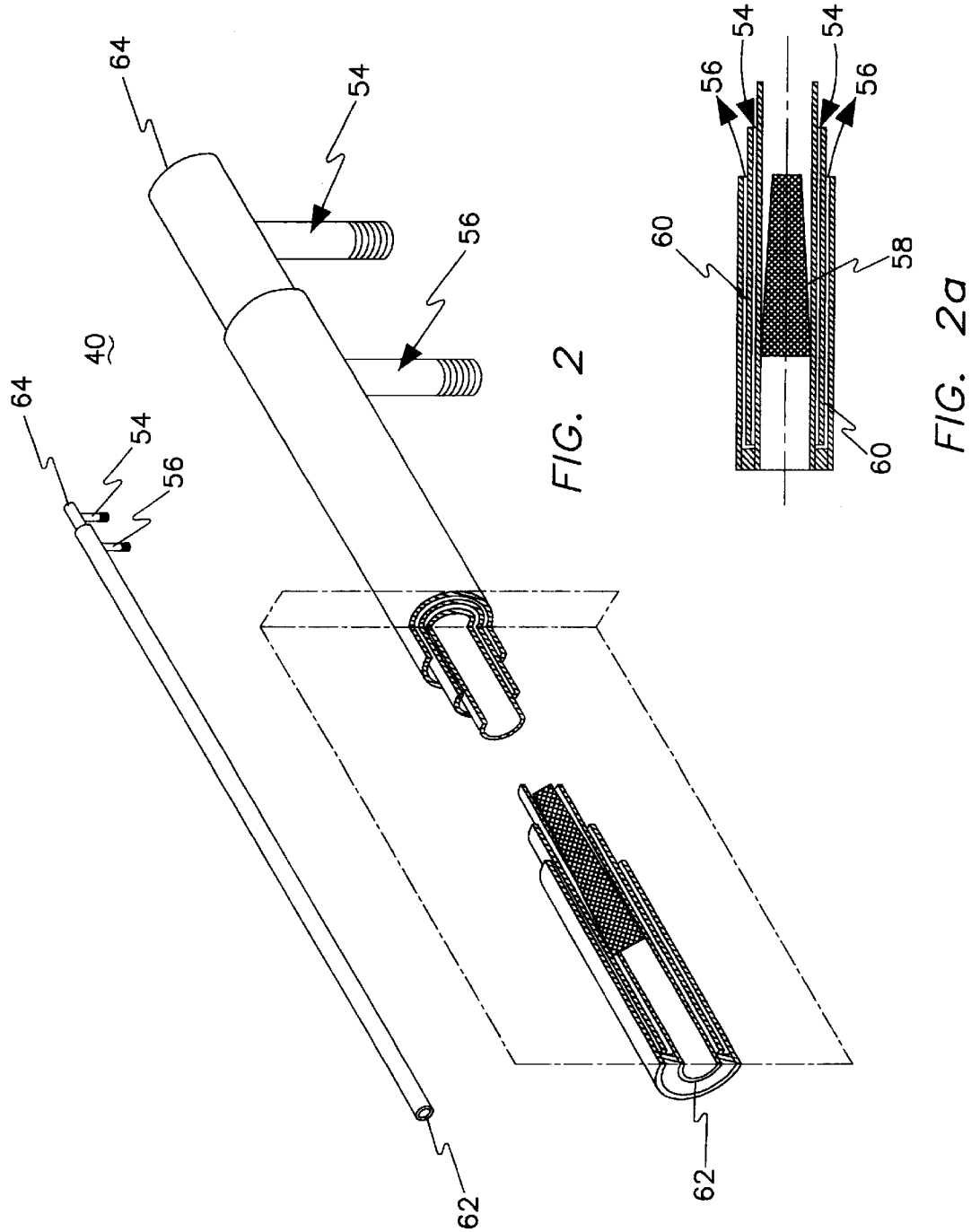
FIG. 2 depicts an example of the thief (hollow lance).

An example of a water-cooled thief 40 is depicted in FIG. 2. Although the figure shows a thimble filter for the purposes of illustration, this can be removed. A stream of partially combusted coal and gases is extracted from the combustion chamber 20 through a coal/gas inlet port 62 of the thief 40. The stream of partially combusted coal and gases exits the thief through the coal/gas exit port 64 of the thief which is coupled to the solid-gas separator 44 and gas pump 42. The water-cooled thief 40 has a water inlet port 54 and a water outlet port 56. Water would circulate through the annular volume of the cooling chamber 60.

The thief 40 could also be designed to concentrate the solids in the gas stream before removal from the combustion zone in order to further reduce the heat rate penalty and optimize the cost of operation. Additionally, a small flow of inert gas may be injected into the thief 40 to help quench the oxidation of the sampled solids.

Returning to FIG. 1, the gas stream 46 from the gas-solid separator may contain unburned hydrocarbons, carbon monoxide, oxygen and nitrogen, among other components, and is recycled back to the combustion chamber 20 or other downstream location. The thermally activated sorbent stream 48 may be further cooled to preserve the reactivity of the solids and to prevent further oxidation. As an option, the thermally activated sorbent may also be chemically or physically treated 50 to enhance its reactivity with mercury. Examples of chemical treatment include washing the sorbent with hydrochloric acid or depositing sulfur on the surface of the sorbent. An example of physical treatment is grinding.

The thermally activated sorbent, whether chemically treated or untreated, may be stored in a hopper 52. An advantage to using a hopper 52 is that the thief, hollow lance, 40 may be operated periodically at the optimum combustion conditions to produce the thermally activated sorbent and then retracted when not in use to reduce the heat rate penalty created by the presence of the lance 40 within the combustion zone 24.

The sorbent, whether chemically treated or untreated, is injected into the duct work 30 of the power plant 10. This injection can occur anywhere before or after the heat exchange unit 32, and preferably where the temperature is 400° F. or less. The sorbent may be injected into the duct work 30 by a feed screw (not shown) into an eductor (not shown) with air as the motive gas, for example. The sorbent will remove elemental and oxidized mercury from the flue gas and will then be collected in the plant's particulate collection system 34 and be removed from the plant 10 along with the fly ash 36 collected by the particulate collection system 34. In another variation, the sorbent could be injected into the duct work 30 but after the plant's particulate collection system 34. Here a separate particulate collection system just for the sorbent could eliminate sorbent contamination of the fly ash collected in the plant's particulate collection system 34 and increase the sorbent's utilization with respect to mercury capture by recycling of the sorbent. Additionally in the event that a wet scrubber is installed in the power plant 10 for flue gas desulfurization, the sorbent may be injected into the flue gas either before or after the scrubbing process.

The coal that is initially injected into the combustion chamber 20 of the power plant 10 will approach complete combustion (i.e. all carbon will have been oxidized) as the coal progresses from the entry port 22 of the combustion chamber 20 toward the exit port 28 of the combustion chamber 20. It is therefore important to determine an optimal location within the combustion chamber 20 to locate the thief 40. By using actual furnace mapping, example 1 describes a potential method for determining thief 40 location within the combustion chamber 20. In examples 1 and 2, pilot-scale combustion facilities are used to obtain thermally activated sorbent or to test sorbent for its reactivity towards mercury in flue gas.

EXAMPLE 1

Figure 3:
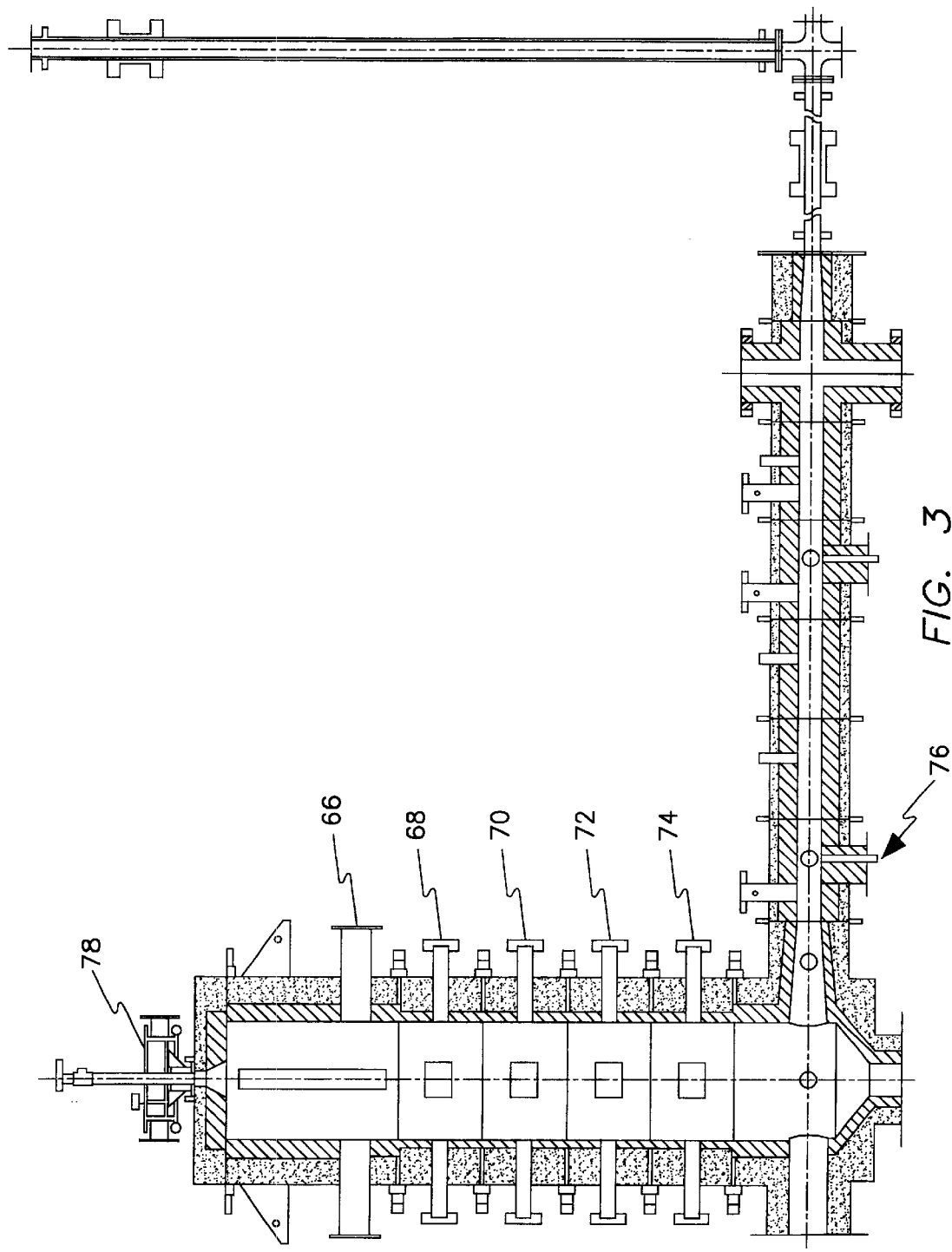
FIG. 3 depicts the Combustion Environmental Research Facility (CERF) located at the National Energy Technology Laboratory.

FIG. 3 depicts the Combustion Environmental Research Facility (CERF) located at the National Energy Technology Laboratory used to characterize the progression of carbon oxidation in this and similar combustion chambers. The CERF is also used to map combustion properties within the various combustion zones.

The CERF is a well-instrumented dry bottom, pulverized coal combustion unit that simulates the firing of a utility power plant. There is one downward firing variable swirl burner 78 where air and pulverized coal are mixed and combusted. There are 5 ports along the length of the combustion chamber where the partially combusted coal and air mixture was extracted for trial as a mercury removing sorbent. Sample port 1 66 is 27 inches from the burner. Sample port 2 68 is 45 inches from the burner. Sample port 3 70 is 63 inches from the burner. Sample port 4 72 is 81 inches from the burner. Sample port 5 74 is 99 inches from the burner.

Two types of coal were investigated, Pittsburgh #8 and Evergreen. The mercury removal capacity of the two partially combusted coal types was compared to a commercially available activated carbon, FLUEPAC by Calgon Carbon Corporation. Solid samples were drawn through the hollow lance 40 and collected on a thimble filter 58 (of FIG. 2A). Samples from the baghouse were also analyzed. The partially combusted carbon extracted from the various ports of the CERF were then used to treat a simulated flue gas containing 16% carbon dioxide, 5% oxygen, 2000 ppm sulfur dioxide, 500 ppm nitric oxide, 270 ppb elemental mercury, and the remainder nitrogen. The simulated flue gas was flowed over the sorbent samples in a small, vertical packed bed reactor at 280° F. A 10-mg sample whose screen size was between 44 and 74 microns was used. The adsorption occurred over 350 minutes. The sorbent was then analyzed for mercury content using cold vapor atomic absorption (CVAA).

The samples were also characterized by BET surface area measurements and pore volume determinations; particle size distribution by a Coulter Multisizer; and bulk chemical analysis for determination of key components. The relevant results are summarized in Table 1.

TABLE 1

Mercury Capacity Results
(A double dash A--A indicates incomplete data. Only selected samples underwent some analyses)

| | BET $m^2g$ | Pore vol. cc/g | $\mu m$, Mean Diameter | Sulfur % | Carbon % | Hydrogen % | Oxygen % | Ash % | Hg Capacity mg/g |
|---|---|---|---|---|---|---|---|---|---|
| Pittsburgh #8 | | | | | | | | | |
| Port 1 | 26.7 | 0.053 | 129 | 1.1 | 61.4 | 0.5 | 0.6 | 35.3 | 1.38 |
| Port 2 | 23.1 | — | 121 | 0.2 | 30.1 | 0.2 | 0.1 | 70.6 | — |
| Port 3 | 17.3 | — | — | — | — | — | — | 80.2 | — |
| Baghouse | 3.1 | — | 91 | 0.6 | 6.2 | 0.1 | — | 93.0 | — |
| Parent coal | 1.8 | — | 71 | 2.3 | 75.6 | 5.5 | 6.0 | 9.4 | — |
| Evergreen | | | | | | | | | |
| Port 1 | 35.1 | — | 107 | 0.5 | 62.1 | 0.7 | 0.1 | 35.7 | — |
| Port 2 | 20.9 | — | 99 | — | — | — | — | 73.6 | — |
| Baghouse | 3.5 | — | 61 | 0.6 | 3.0 | 0.1 | 1.2 | 95.0 | — |
| Evergreen | | | | | | | | | |
| Port 1 | 31.2 | 0.042 | 134 | 0.6 | 49.8 | 0.5 | 2.6 | 46.6 | 2.03 |
| Port 2 | 23.6 | 0.041 | 128 | 0.6 | 32.5 | 0.3 | — | 67.9 | — |
| Port 3 | 14.2 | — | 108 | 0.2 | 14.5 | 0.2 | — | 86.6 | — |
| Baghouse | 3.7 | — | 78 | 0.2 | 3.6 | 0.1 | — | 96.8 | — |
| Parent coal | 3.2 | 0.008 | 62 | 1.1 | 70.9 | 4.8 | 7.1 | 14.9 | 0.19 |
| FLUEPAC | 606 | 0.285 | 45 | 0.7 | 83.3 | 1.7 | 5.8 | 5.8 | 1.61 |

EXAMPLE 2

In a pilot-scale study, a thief sample from Evergreen coal was injected into the duct work as Evergreen coal was being combusted. The sorbent had actually been obtained from a thief located in the combustor of the pilot facility. Flue gas samples were collected and analyzed for mercury content. Samples were taken from the duct work both before and after the particulate collection device. Performance of the Evergreen-derived sorbent was compared to flue gas samples taken at the same locations when no sorbent had been injected into the duct work of the plant. Results from the pilot scale study are summarized in Table 2.

TABLE 2

Results of Injecting a "Thief" Sample Into the Duct Work of a Combustor

| Thief Sample | Nominal Temp °F. | Sorbent Injection rate g/hr | Avg. Hg inlet conc. mg/dscm@3% $O_2$ | Std. inlet Hg deviation g/dscm@3% $O_2$ | Mercury removal % |
|---|---|---|---|---|---|
| Evergreen | 270 | 307 | 11.3 | 0.5 | 59 |
| None | 270 | 0 | 11.3 | 0.5 | 20 |

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiments described explain the principles of the invention and practical applications and should enable others skilled in the art to utilize the invention in various embodiments and with various modifications as are suited to the particular use contemplated. While the invention has been described with reference to details of the illustrated embodiment, these details are not intended to limit the scope of the invention, rather the scope of the invention is to be defined by the claims appended hereto.

What is claimed is:

1. A mercury removal system for removing mercury from a flue gas, comprising:

a combustion chamber having a combustion zone where a mixture of coal and air undergoes combustion;

means for removing a partially combusted stream of said mixture of coal and air directly from said combustion zone;

means for separating said partially combusted stream of said mixture of coal and air into a gas recycle stream and a thermally activated sorbent stream;

a flue gas transport duct where said duct is coupled to an exit port of said combustion chamber and where said duct carries a flue gas stream away from said combustion chamber;

means for contacting said thermally activated sorbent stream with a flow of the flue gas at a downstream location relative to said combustion chamber; and means for removal of said thermally activated sorbent stream containing said mercury.

2. The mercury removal system of claim 1, wherein:

said means for removing said partially combusted stream of said coal and air includes at least one hollow lance positioned in said combustion zone and coupled to a vacuum (suction) system.

3. The mercury removal system of claim 2, wherein:

an entry port of said hollow lance is located within said combustion zone where a combustion zone temperature is between about 1000 to about 3000° F.

4. The mercury removal system of claim 2, wherein:

said hollow lance is surrounded by a cooled chamber and where said cooled chamber is jacketed by a layer of reflective material.

5. The mercury removal system of claim 1, wherein:

said means for separating said partially combusted stream of said mixture of coal and gas into a gas recycle stream and a thermally activated sorbent stream is at least one gas-solid separator.

6. The mercury removal system of claim 1, wherein said thermally activated sorbent stream enters said flue gas stream at a location where a temperature of the flue gas is in a range of up to about 400° F.

7. The mercury removal system of claim 1, wherein:

said means for contacting said thermally activated sorbent stream with a flow of the flue gas is a feeder, where said feeder injects said thermally activated sorbent stream into said transport duct.

8. The mercury removal system of claim 7, wherein said thermally activated sorbent is a chemically treated or physically-treated sorbent.

9. The mercury removal system of claim 8, wherein said chemically treated sorbent is said thermally activated sorbent washed with hydrochloric acid.

10. The mercury removal system of claim 8, wherein said chemically treated sorbent is said thermally activated sorbent where sulfur has been deposited thereon.

11. A method for removing mercury from a flue gas of a coal fired power plant by use of a thermally activated sorbent created in-situ, comprising the steps of:

injecting a pulverized coal and air mixture into a combustion chamber;

extracting a stream of semi-combusted pulverized coal and gas directly from a combustion zone within said combustion chamber;

separating said stream of semi-combusted pulverized coal and gases into a gas recycle stream and a thermally activated sorbent stream;

re-injecting said gas recycle stream into said combustion chamber, or other downstream location;

cooling said thermally activated sorbent;

contacting said thermally activated sorbent with the flue gas at a location downstream from said combustion chamber within the power plant where the mercury removal results from the contacting of said thermally activated sorbent with the flue gas; and collecting said thermally activated sorbent containing an amount of mercury removed from the flue gas in a particulate collection device.

12. The method of removing mercury according to claim 11, wherein the step of extracting said stream of semi-combusted pulverized coal and gas directly from a combustion zone within said combustion chamber is accomplished by inserting a hollow lance into said combustion zone and by applying suction to said hollow lance.

13. The method of removing mercury according to claim 12, wherein the step of extracting said stream of semi-combusted pulverized coal and gas directly from a combustion zone within said combustion chamber is by inserting said hollow lance into said combustion zone where a combustion zone temperature is in a range of about 1000 to about 3000° F.

14. The method of removing mercury according to claim 11, wherein the step of separating said stream of semi-combusted pulverized coal and gases into a gas recycle stream and a thermally activated sorbent stream is accomplished by directing said stream of semi-combusted pulverized coal and gases into a gas-solid separator.

15. The method of removing mercury according to claim 11, wherein the step of contacting said thermally activated sorbent with the flue gas at a location downstream from said combustion chamber within the power plant is accomplished by injecting said sorbent into a duct containing said flue gas with a feed device.

16. The method of removing mercury according to claim 11, further comprising the step of physically treating or treating the thermally activated sorbent with a chemical prior to contacting said thermally activated sorbent with the flue gas at a location downstream from said combustion chamber within the power plant.

17. The method of removing mercury according to claim 16, wherein the step of treating the thermally activated sorbent with a chemical is by washing said sorbent with hydrochloric acid.

18. The method of removing mercury according to claim 16, wherein the step of treating the thermally activated sorbent with a chemical is by depositing sulfur on the sorbent.

19. The method of removing mercury according to claim 11, wherein the step of contacting said thermally activated sorbent with the flue gas at a location downstream from said combustion chamber within the power plant is conducted where a flue gas temperature is in a range of up to about 400° F.

* * * * *